Aug. 17, 1943.  P. M. WHEELER  2,327,294
APPARATUS FOR AND METHOD OF MAKING X-RAY PHOTOGRAPHS
Filed Feb. 24, 1941  3 Sheets-Sheet 1
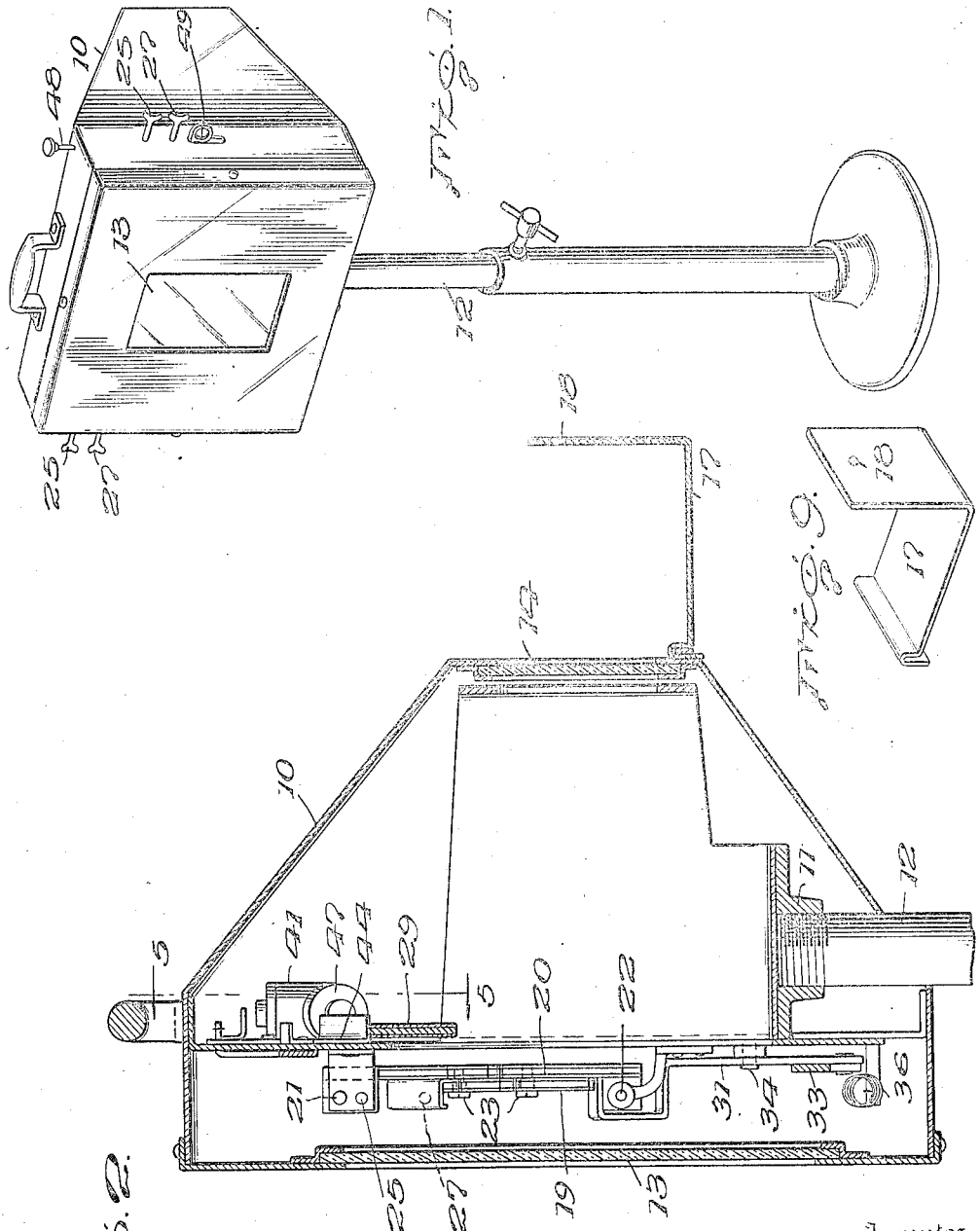
Inventor
Preston M. Wheeler,
By Church & Church
His Attorneys

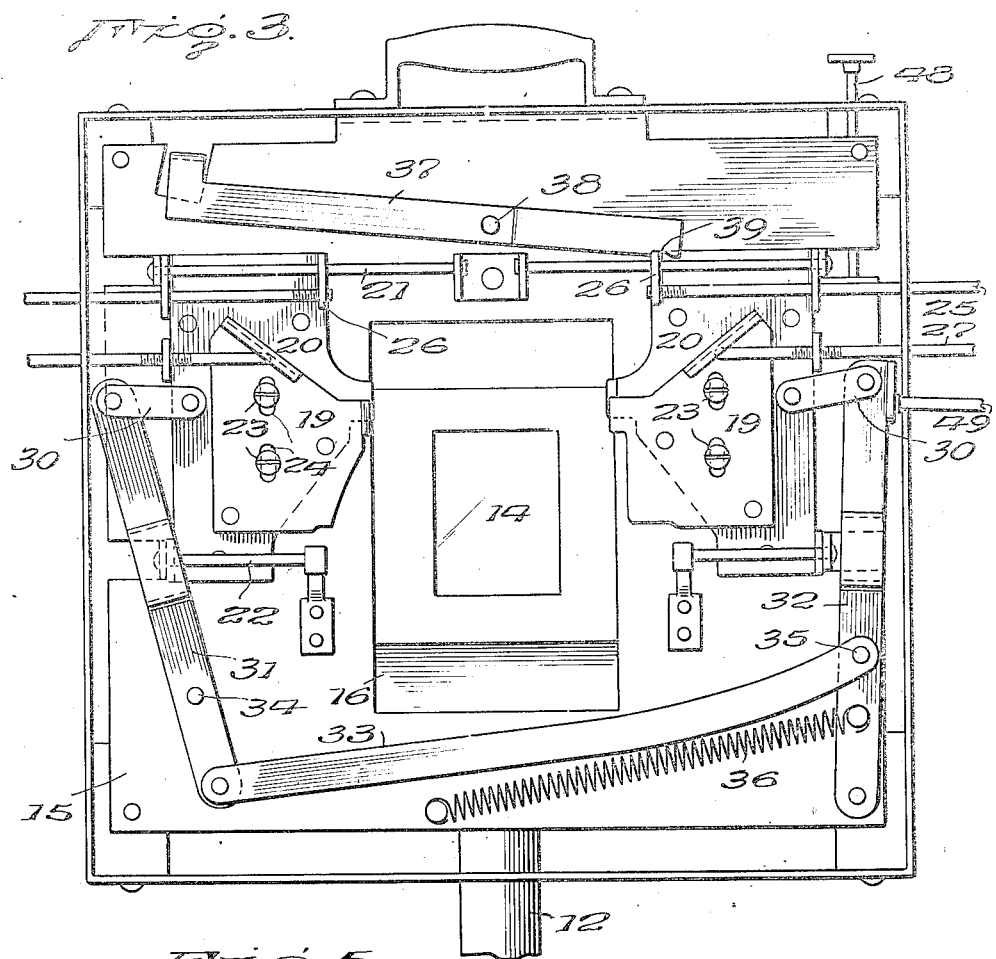
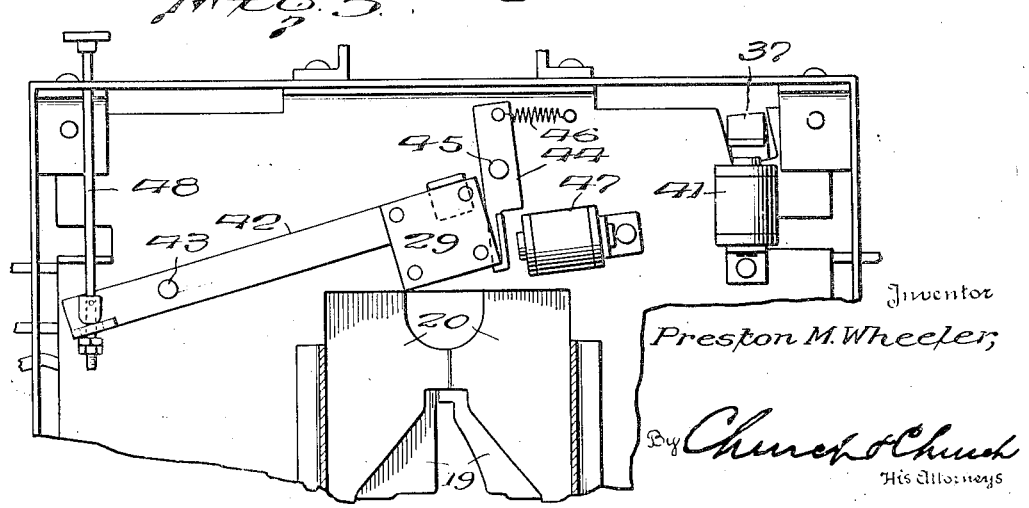

Aug. 17, 1943.  P. M. WHEELER  2,327,294
APPARATUS FOR AND METHOD OF MAKING X-RAY PHOTOGRAPHS
Filed Feb. 24, 1941  3 Sheets-Sheet 3
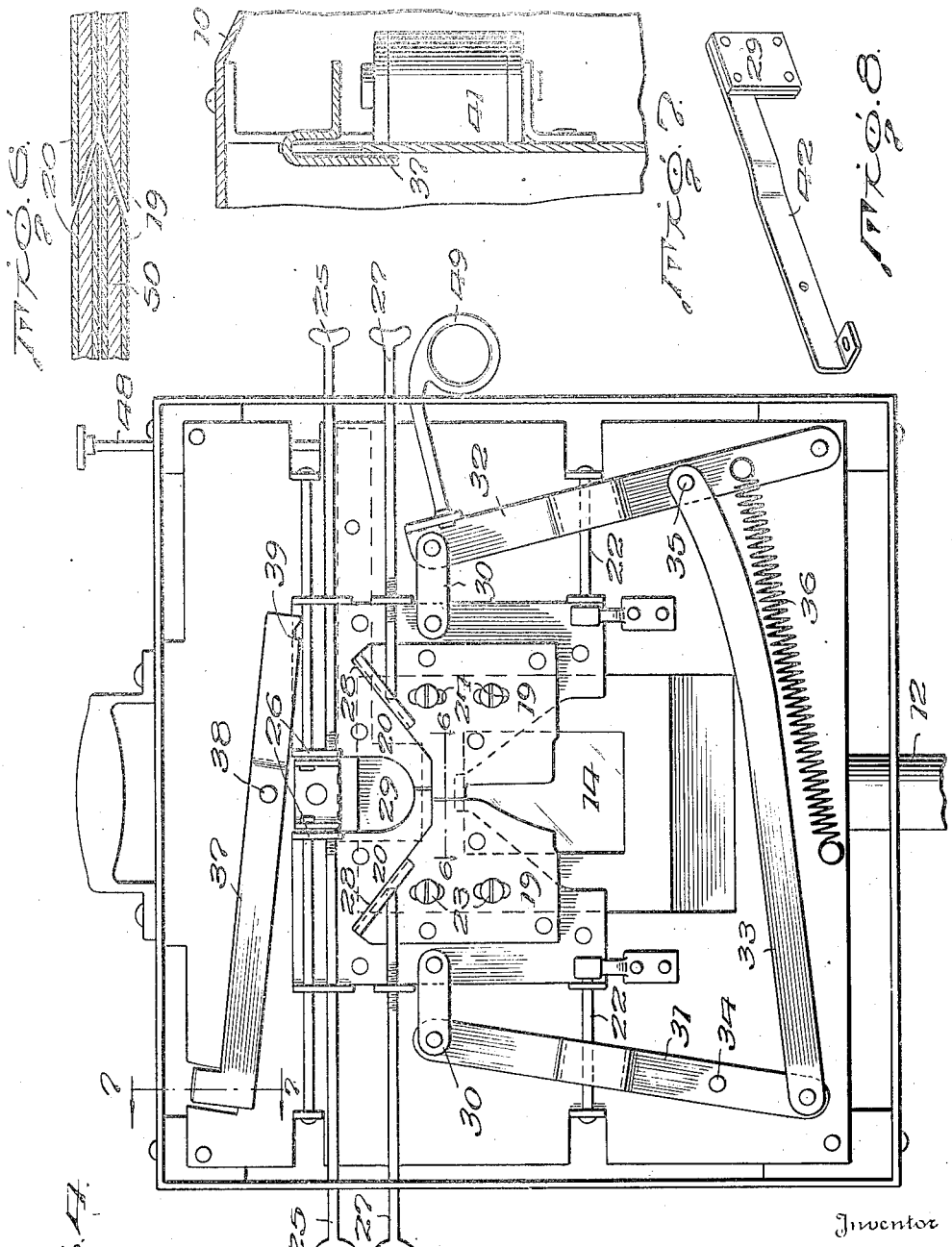
Inventor
Preston M. Wheeler,
By Church & Church
His Attorneys Patented Aug. 17, 1943

2,327,294

UNITED STATES PATENT OFFICE 2,327,294

APPARATUS FOR AND METHOD OF MAKING X-RAY PHOTOGRAPHS

Preston M. Wheeler, Austin, Tex.

Application February 24, 1941, Serial No. 380,348

4 Claims. (Cl. 250—65)

This invention relates to apparatus for making X-ray exposures or radiographs, and particularly to means for controlling the exposure of an object while being radiographed. In making radiographs of some subjects or objects, it is quite difficult to obtain uniform exposure over the entire area of the object. For instance, in taking a radiograph of the spine, certain portions of the anatomy being denser than other portions, varying effects will be produced on different portions of the film if the entire object and film are exposed for the same period of time. Accordingly, the primary object of the present invention is to provide an attachment for X-ray apparatus for varying the duration of exposure for different portions of an object, dependent upon the relative density of those objects.

Another object is to provide means for blocking off portions of an object from exposure in a sequence, dependent upon the relative density of the several portions.

Still another object is to provide members impervious to the X-rays for blocking off the desired portions of the object and have said members adjustable relatively to one another, whereby objects of different proportions, or areas within the object of different proportions, can be properly blocked off from exposure. In this connection, the impervious members that are used for blocking off the X-rays are adjustable toward and from one another, and to compensate for adjustment of said members away from one another, they are adapted to have portions thereof overlapping at all times when they are in position to block off the object from exposure.

Still another object contemplated by the present invention is a novel method of controlling exposure of an object to X-rays in the radiographing thereof, wherein the entire object is first exposed by directing rays upon the object through an exposure aperture and subsequently obstructing predetermined areas of said exposure opening to block off the rays from those portions of the object which are more readily penetrated by the rays. Any number of portions of the object can be successively blocked off, the sequence being such that the more readily penetrated portions are the first to be blocked off, while the denser portions are the last to be blocked off; although, in the actual practice of the present method, the densest portion is never blocked off, as complete exposure of that portion is actually the end of the radiographing process.

With these and other objects in view, the invention consists in certain details of construction and arrangements and combinations of parts, all of which will be hereinafter more fully described and the novel features thereof particularly pointed out in the appended claims.

In the preferred form of apparatus at present adopted for practicing the method herein contemplated, which is illustrated in the accompanying drawings—

Figure 1 is a perspective view of one form of machine embodying the present improvements;

Fig. 2 is a vertical sectional view;

Fig. 3 is a front elevation with the cover removed and the exposure opening unobstructed;

Fig. 4 is a view similar to Fig. 3, but illustrating the exposure opening as partially closed by the obstructing members;

Fig. 5 is a sectional view on the line 5—5 of Fig. 2;

Fig. 6 is a sectional view on the line 6—6 of Fig. 4;

Fig. 7 is a sectional view on the line 7—7 of Fig. 4;

Fig. 8 is a detail perspective view of one of the members utilized for obstructing the exposure opening; and Fig. 9 is a perspective view of an attachment for use in properly setting the apparatus to focus it upon the object.

Preferably, the present apparatus takes the form of a unit structurally independent of the X-ray apparatus proper, and this unit comprises a casing 10 having a base portion 11 adapted to be mounted on a standard 12 which may comprise telescoping sections to permit of vertical adjustment. At the front and rear, the casing 12 has openings for the passage of the X-rays, said openings being provided with transparent closures 13, 14, such as will not interfere with the passage of the X-rays through said openings. Intermediate these front and rear openings in the interior of the casing 10, there is a partition member 15 formed with an exposure opening 16, this opening and the openings at the front and rear of the casing 10 being alined with one another. To facilitate proper setting of the apparatus with respect to the object to be radiographed, a sight member 17 may be detachably secured or clipped on the rear of the casing 10. This sight member 17 has a sight opening 18 therein whereby the operator, looking through this sight opening 18 and the openings in the housing may properly direct the apparatus upon the object, it being understood that, after the apparatus has been set, the sight member 17 may be removed and the X-ray tube placed in the position formerly occupied by the sight opening 18, under which circumstances the X-rays are certain to be properly directed upon the object. It will also be understood that, in the use of the present apparatus and method, the proper film will be properly positioned at the side of the object opposite to that at which the apparatus is located.

In the use of the present apparatus the exposure opening 16 in the partition 15 in the interior of the casing is fully opened, so that the entire area of the object to be radiographed is exposed, but, after the portions of the object of least density have been exposed for a time necessary to properly radiograph them, members impervious to the X-rays are adapted to be positioned in the opening 16 so as to block off those particular portions. Subsequently, as other portions of the object of somewhat greater density have been properly exposed, additional portions of the exposure opening 16 are obstructed by members impervious to the X-rays, and so on, until all except the densest portions of the object have been properly exposed, at which time the radiographing process will have been completed. For instance, in radiographing the spine of the human body, for which the present apparatus is especially designed, the neck and the area occupied by the lungs of the patient are of less density than other portions of the body. On the other hand, the heart and the abdomen are the densest portions, while the chin and jaws may be said to possess an intermediate degree of density. Consequently, in the use of the present apparatus in making a radiograph of the spine of the human body, the body of the patient for for the full length of the spine is exposed to the X-raying tube with the rays directed through the opening 16 at the initiation of the radiographing process. Then, after the throat and lung areas have been properly exposed, plate-like members are adapted to move from the position shown in Fig. 3 to the position shown in Fig. 4 to partially obstruct the exposure opening 16, the areas occupied by these plate-like members when moved in front of the exposure opening corresponding to the lung and throat areas of the patient. As shown in Fig. 4, this leaves the lower portion of the exposure opening 16 unobstructed over the area corresponding to the abdomen and heart of the patient and also the upper portion of said opening corresponding to the jaw and chin area of the patient. After the jaw and chin area has been properly exposed, another impervious plate-like member is adapted to be moved into position to close the upper portion of the exposure opening 16. This leaves only that portion of the opening 16 corresponding to the heart and abdomen unobstructed and, after these portions of the patient have been properly exposed, the radiographing is completed and, hence, there is no need for providing obstructing members for this lower portion of the opening 16.

In order to provide adjustability of the plate members that are utilized for blocking off the lung and throat areas of the patient, these members are preferably made of sectional construction. As best shown in Figs. 3 and 4, there is positioned at each side of the exposure opening 16 two plates 19, 20, all capable of moving transversely of the exposure opening. The plates 20 are slidable laterally on upper and lower guide rods 21, 22, and the plates 19 are carried on the plates 20, being attached to the plates 20 by headed guide pins 23 extending through slots 24, whereby the plates 19 may move vertically relatively to the plates 20. The guide rods 21, 22 are mounted in suitable brackets on the partition 15. It will be appreciated that the apparatus must be capable of use in making radiographs of individuals of different proportions or stature. For instance, some persons will have comparatively long necks or, perhaps, comparatively narrow faces, while others may have rather short, thick-set necks and comparatively broad chins and faces. For this reason, the plates 20 are adjustable toward and from each other by means of screws 25 extending into the casing 10 from opposite sides thereof and having their inner extremities threaded into offset portions 26 on the respective plates 20. As will be apparent, manipulation of these screws 25 will move the plates on the supporting rods toward and from each other, depending upon the direction of rotation given the screws. Similarly, screws 27 extending into the casing from opposite sides thereof are adapted to have their inner extremities impinge against inclined portions 28 on the respective plates 19, so that by advancing or retracting these screws 27, the plates 19 can be raised or lowered with respect to the plates 20. Thus, by a combination of adjustments of the plates 19 and 20, the former being raised or lowered and the latter being adjusted toward and from each other, proper compensation can be made for patients of varying proportions in those parts of their anatomy above referred to. In this connection, it is important, of course, that, regardless of the extent to which the plates 20 might be adjusted away from one another, they must completely obstruct the proper area of the exposure opening 16, when they are moved into registry with the exposure opening. For this reason, the plates at opposite sides of the opening are of such size or width that their contiguous portions overlap when they are moved to closed position. In other words, by having the contiguous edges of the plates overlapping, as distinguished from abutting, it is possible to adjust the plates away from one another and still, at the same time, have them obstruct the exposure opening all the way across the latter, when the plates are moved into what might be termed obstructing position.

As indicated above, the area left unobstructed at the upper portion of the exposure opening when the plate members 19, 20 are closed, must, also, be later closed when the jaw and chin of the patient have been properly exposed. For this purpose, there is provided a closure member 29 impervious to the X-rays. Normally, this member 29 is positioned above the exposure opening, as best seen in Fig. 5, but, when the chin and face have been properly exposed, this member is adapted to be lowered to close the upper area of the exposure opening.

Operation of the several obstructing members may be effected in various ways, but, in the present instance, the plates 20 are connected by links 30 to levers 31, 32, and said levers are connected by a link 33 pivotally attached to each of said levers. Lever 31 is pivoted on a pin 34 mounted in the partition 15, and lever 32 is pivoted on a pin 35, and attached to lever 32 at its end opposite that to which the plate 20 is connected is a spring 36 which is tensioned when the plates 19, 20 are in their open position, as illustrated in Fig. 3, so that the tendency of the spring is to normally urge the plate members 19, 20, toward the exposure opening. To normally hold the plates in their open position, there is a latching lever 37 pivoted at 38 on partition 15, one end of said lever being provided with a recess 39 adapted to engage one of the offset portions 26 on one of the plates 20 when the plates are in open position. The opposite end of latching lever 37 terminates adjacent an electromagnet 41, this end of said lever being bent over to project on the opposite side of the partition where the electromagnet is mounted, so as to interfere with movement of the plates 20. Similarly, the ray-obstructing member 29 is carried on a lever 42 pivoted at 43 and an angular portion of said member 29 is adapted to engage in the recessed end of a latching lever 44 pivoted at 45 and normally urged toward the member 29 by a spring 46. Latching lever 44 has associated therewith an electromagnet 47 and, as will be apparent, when it is desired to release the plates 19 and 20 all that is necessary is to energize electromagnet 41, whereupon latching lever 37 will be tripped and, when it is desired to lower the obstructing member 29, the electromagnet 47 is energized to trip the latching lever 44. To reset the several obstructing members or return them to their unobstructing positions, there is a plunger 48 (Fig. 5) by means of which the lever 42 carrying member 29 can be depressed at one end to elevate the opposite end thereof, at which point the member 29 is mounted on said lever. Similarly, the lever 32 for actuating one of the plates 20 carries a finger grip 49 located at the exterior of the casing 10, whereby lever 32 may be retracted, which, of course, will also impart a retractive movement to lever 31 by reason of the connecting link 33 between said levers.

The overlapping, contiguous edge portions of the obstructing plates 19, 20 are best illustrated in the detail sectional view of Fig. 6. It will also be understood that, while the present plates are illustrated as being of a laminated construction comprising an intermediate layer of lead 50 for obstructing or blocking off the X-rays, nevertheless, these members need not necessarily take this particular form, the essential point merely being that these plate members be of such material as will prevent the passage of the X-rays through the exposure opening when said plates are interposed in said opening.

What I claim is:

1. In an apparatus for controlling the exposure of an object to X-rays during the radiographing of said object, the combination of a frame having an exposure opening therein through which the entire area to be radiographed may be exposed to the X-rays, two pairs of members impervious to said rays for partially closing said opening to reduce the area of the opening to correspond to the area of said object of greatest density, means for adjusting the members of one pair of members toward each other, means for adjusting the members of the other pair of members longitudinally of said opening and means for moving the members of each pair toward each other transversely of said opening.

2. In an apparatus for controlling the exposure of the object in making a radiograph of the human spine, the combination of a frame through which the entire area to be radiographed may be exposed to the X-rays, plates impervious to said X-rays slidably mounted on said frame, means for moving said plates to positions within the boundaries of the opening for blocking off the rays normally directed to those portions of the object of least density, a member impervious to said X-rays supported on said frame, means for moving said member into said exposure opening for blocking off the X-rays normally directed to the next less dense portion of the object, means releasably retaining said plates in positions beyond the boundaries of said opening, means releasably retaining said member in position beyond the boundaries of said opening, and means for releasing said plates independently of said member.

3. In an apparatus for controlling the exposure of an object to X-rays during the radiographing of said object, a frame having an exposure opening therein through which the rays may be directed toward the object, and closure members for partially obstructing said opening, each closure member comprising two sections adjustably connected to each other, said members being movable toward each other to at least partially close said opening, means for adjusting one section of a member relatively to the other section of said member and means for moving said members toward each other.

4. In an apparatus for controlling the exposure of an object to X-rays during the radiographing of said object, a frame having an exposure opening therein through which the rays may be directed toward the object, closure members carried by said frame, each member comprising two sections adjustable with respect to each other and movable toward each other to partially close said opening, means for moving said members toward each other and means for adjusting said members toward and from each other.

PRESTON M. WHEELER.